Sept. 18, 1928.
H. G. CATHCART
ELECTRIC HEATER
Filed March 23, 1925
1,684,472
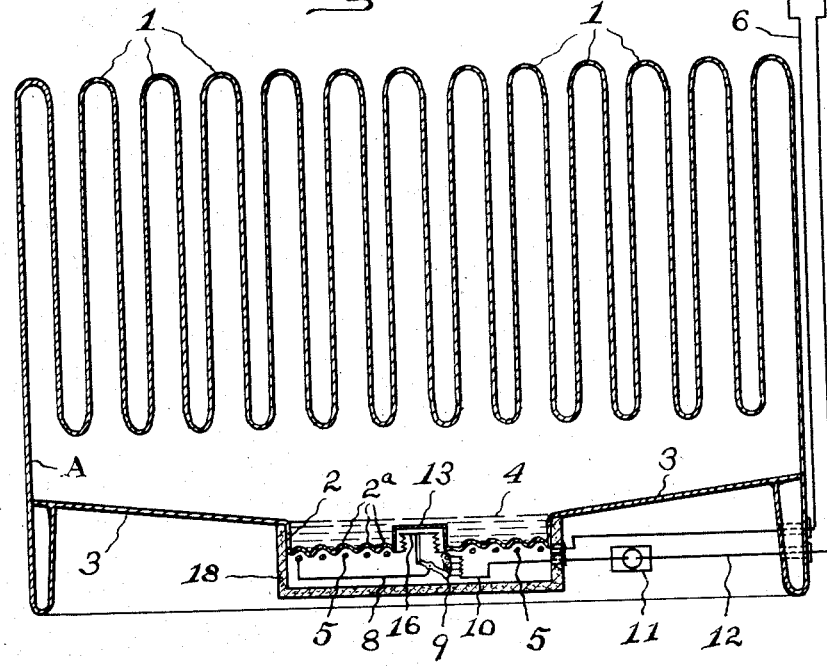
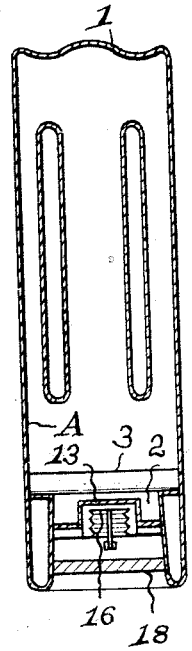
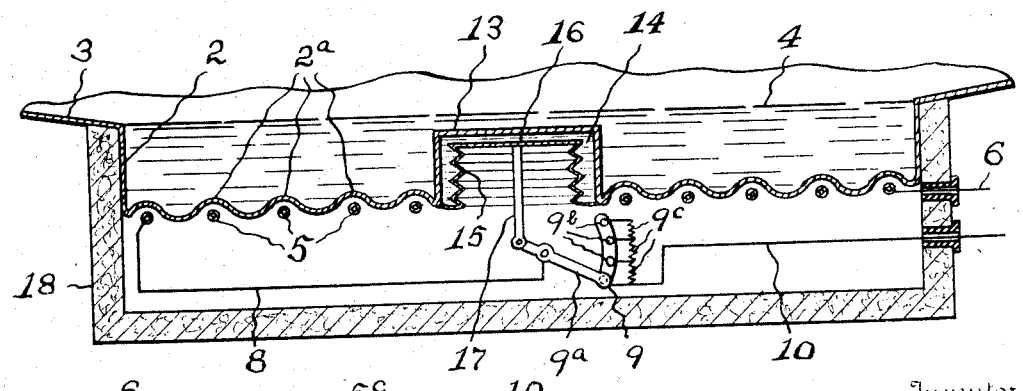
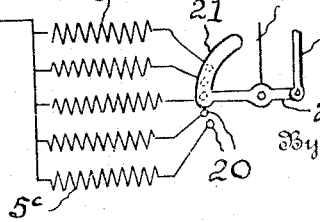
Inventor
H. G. Cathcart
By Robb Robb Hill
Attorney Patented Sept. 18, 1928.

1,684,472

UNITED STATES PATENT OFFICE.

HARRY G. CATHCART, OF CLEVELAND, OHIO.

ELECTRIC HEATER.

Application filed March 23, 1925. Serial No. 17,550.

The present invention relates to electric heaters and has for its object to provide a device of this character which embodies novel features of construction whereby the energy of an electric current can be quickly and effectively converted into heat and transmitted to the surrounding atmosphere for the purpose of raising the temperature thereof.

Further objects of the invention are to provide an electric heating device of this character which is comparatively simple and inexpensive in its construction, which has a large radiating surface and will act quickly to raise the temperature of the surrounding atmosphere after the electric current is turned on, and which may be automatically regulated and is quickly responsive to temperature changes.

A further object of the invention is to provide an electrically operated vapor heater in which a highly volatile fluid such as alcohol or ether is used in a closed chamber from which air has been exhausted, so that the fluid will be very quickly vaporized and the device caused to emanate heat at its maximum capacity very shortly after the electric current is turned on.

A still further object of the invention is to provide an effective thermostat for automatically controlling the supply of the electric current according to the operation of the heater, and providing for gradually increasing and decreasing the amount of current supplied to the heater instead of suddenly throwing the current off and on at intervals, thereby obtaining greater uniformity in the action of the heater.

One particular embodiment of the invention has been shown and described in detail for illustrative purposes, although it will be understood that many modifications and changes can be made in the details of construction without departing from the spirit of the invention.

For a full understanding of the invention reference is to be had to the following description and accompanying drawings in which, Figure 1 is a longitudinal sectional view through an electrically operated vapor heater which is constructed in accordance with the invention.

Figure 2 is an enlarged sectional view through the electrically operated heating means at the base of the heater.

Figure 3 is a transverse sectional view through the heater.

Figure 4 is a diagrammatic view showing a modified arrangement of the heating elements and the automatic control for the same.

Corresponding and like parts are referred to in the following description and indicated on all of the views of the drawings by like reference characters.

Referring to the drawings, the reference character A designates the casing or shell of the vapor heater, said casing being formed of some material which is a good conductor of heat, such as sheet metal, and being preferably constructed with a plurality of hollow radiator sections 1, so as to offer a large heat radiating surface, said radiator sections all opening at their lower ends into the bottom or lower portion of the main casing A. This main casing is hermetically sealed and preferably has air exhausted therefrom so that there is a partial vacuum within the casing. This prevents the formation of dead air spaces in the radiator sections and causes the heater to radiate heat from its entire surface when the volatile fluid within the same is vaporized.

A shallow pocket 2 is formed in the bottom of the casing A and, as indicated at 3, the bottom of the casing is inclined so that as the volatile fluid condenses and drops to the bottom of the casing it will be drained into the pocket 2. This pocket is initially filled with some volatile fluid 4 such as alcohol or ether which will boil and vaporize at a comparatively low temperature, and there is just a sufficient quantity of the fluid 4 to saturate or fill the casing with the vapor when the fluid has been completely vaporized, thereby rendering it unnecessary to provide a safety valve or outlet, since it will not be possible to generate a dangerous pressure within the casing.

The bottom of the pocket 2 is shown as formed with corrugations $2^a$ and an electric resistance element 5 is threaded back and forth within these corrugations so that when the resistance wire is heated the fluid within the pocket will be in turn heated and vaporized. One of the terminals of the resistance element 5 is connected by a wire 6 to a conventional thermostat 7 which may be suitably arranged in the room or compartment which is to be heated. The other terminal of the resistance element is connected by a wire 8 to a rheostat 9 which is arranged for introducing resistance into the current when this becomes necessary to regulate the proper operation of the heater. A wire 10 connects the rheostat to one of the terminals of an ordinary outlet plug 11, the other terminal of the said outlet plug being connected by a wire 12 to the thermostat 7.

The thermostat 7 operates in the usual and well known manner to switch the current off when the temperature of the room reaches a predetermined point and to switch the current on when the temperature falls below the said predetermined point. The rheostat 9 is automatically operated to introduce resistance into the heating current when the volatile fluid 4 has been completely vaporized, thereby preventing electric current from being wasted in the operation of the heater when the room is not heated sufficiently to operate the thermostat 7, notwithstanding the fact that the heater itself may be operating at full capacity.

The bottom of the shallow pocket 2 is provided with a raised portion 13 enclosing a chamber which contains a small quantity of a fluid 14 which is slightly more volatile than the fluid 4. The bottom of this small chamber has an opening therein and the edges of this opening are connected by an expansible neck 15 having a folded or bellows formation with a diaphragm 16. When the fluid 14 is heated sufficiently so that it becomes partly volatilized the pressure which is thereby generated within the chamber acts upon the diaphragm 16 to force the same downwardly. This diaphragm is connected by a link 17 to the rheostat lever $9^a$. When the diaphragm 16 is forced downwardly the lever $9^a$ is swung about its pivot point and the outer end thereof swung across the several contact points $9^b$ of the rheostat, thereby interposing one or more of the resistance elements $9^c$ of the rheostat into the circuit with the main resistance element 5. The rheostat and resistance wires are mounted within a housing 18 which is pendant from the pocket 2 at the bottom of the radiator casing and which is formed of suitable heat insulating material such as asbestos or the like. The ends of the housing are shown as extending upwardly along the sides of the ends of the pocket and the housing extends downwardly below the pocket to provide a chamber within which the rheostat and resistance elements can be mounted.

In the operation of the heater the electric current may be turned on either by closing a suitable switch or by inserting the plug in the outlet or socket 11. The main resistance element 5 is then heated by the electric current and the heat from this resistance element acts upon the bottom of the pocket 2 to heat the volatile fluid therein. Owing to the fact that this fluid boils or vaporizes at a comparatively low temperature the fluid will be quickly vaporized and this vapor will rise and fill the various radiator sections 1 of the main casing, so that the walls of the radiator will be heated and heat radiated therefrom to the surrounding atmosphere. The casing has the air exhausted therefrom so that there will be no air pockets and just a sufficient quantity of the volatile fluid 4 is used to completely fill the casing with vapor when all of the fluid has been vaporized, so that a dangerous pressure will never be generated within the casing and a special safety or outlet valve is not necessary. As the heat is given off to the surrounding atmosphere the vapor condenses on the walls of the casing and is turned back into the shallow pocket 2 where it is again subjected to heat from the resistance element and again vaporized.

After the temperature of the room or compartment in which the heater is placed is raised to the desired point the electric current will be automatically cut off by the thermostat 7. However, if the temperature of the room or compartment is still below the desired point and the heater is operated at maximum efficiency with all of the fluid 4 volatilized, the temperature within the casing will act upon the volatile fluid 14 within the chamber of the raised portion 13, with the result that this fluid 14 will be partially volatilized and pressure produced within the chamber to act upon the diaphragm 16 and swing the lever of the rheostat. The movements of this lever operate to bring in one or more of the resistances $9^c$ of the rheostat, thereby causing less current to flow through the main resistance element 5 so that the latter is not heated to as high a temperature. Instead of suddenly cutting the current completely off or switching it completely on, the rheostat causes more or less current to flow through the main resistance element, as may be necessary, to keep all of the fluid 4 in the radiator casing in a volatile condition. Owing to the fact that a highly volatile fluid such as alcohol or ether is employed and used in a hermetically sealed radiator casing, the heater is quicker in its action and sensitive to temperature changes. The use of a rheostat for automatically causing more or less current to flow through the main resistance element, as may be required, also enables the heater to be effectively controlled and maintained at maximum efficiency without wastage of the electric current.

A slight modification is illustrated diagrammatically by Figure 4, in which a series of heating elements $5^c$ are adapted to be arranged under the bottom $2^a$ of the pocket 2. These resistance elements $5^c$ are arranged in parallel so that one or more of the resistance elements can be cut out when desired and any desired number thereof utilized for heating the volatile fluid in the pocket. The resistance elements 5ᵉ are all connected at one end to a lead wire 6. The opposite ends of the resistance wires are connected to contact buttons 20 which are adapted to be engaged by a contact plate 21 on a lever 22 which corresponds with the rheostat lever 9ᵃ of the embodiment of the invention illustrated by Figure 2. This lever 22 is connected by a link 17 to the diaphragm 16 of the chamber containing the less volatile fluid 14. After all of the fluid 4 of the pocket 2 has been volatilized the heat acts upon the less volatile fluid 14 and as this fluid is vaporized pressure is produced within the chamber and the diaphragm is forced downwardly. This movement of the diaphragm is transmitted through the link 17 to the lever 22, with the result that the contact plate 21 is caused to slide over the contact buttons 20. The contact plate normally covers all of the contact buttons so that all of the resistance units 5ᶜ are heated. The swinging movement of the lever 22 causes the contact buttons 20 to be successively uncovered, with the result that one or more of the resistance units 5ᶜ is cut out of the circuit. With this construction all of the units 5ᶜ of the resistance will be introduced into the circuit and heated until after all of the volatile fluid 4 has been vaporized and the heat acts upon the less volatile fluid 14 of the chamber to partially vaporize the same. When this stage has been reached in the operation of the heater one or more of the units 5ᶜ of the resistance will be automatically cut out and just a sufficient number of the units maintained in the circuit to keep the volatile fluid 4 completely vaporized. The heater will thus be enabled to operate at maximum efficiency without any wastage of the electric current.

Having thus described my invention what I claim as new and desire to secure by Letters Patent is:

1. A heater of the character described, including a radiator casing provided with a pocket, a volatile fluid normally carried by drainage into the pocket, a resistance element for heating the fluid within the pocket to vaporize the same, a chamber arranged within the pocket and containing a fluid less volatile than that previously mentioned, a rheostat interposed in the circuit of the main resistance element, and means actuated by pressure within the said chamber containing the less volatile fluid for operating the rheostat.

2. A heater of the character described, including a radiator casing, a quantity of volatile fluid therein, an electric resistance element for heating the fluid to vaporize the same, a chamber within the radiator and having an enclosing wall adapted to be moved by internal pressure within the chamber, fluid within the chamber which is slightly less volatile than the volatile fluid previously mentioned, a rheostat interposed in the circuit of the resistance element, and means actuated by the movements of the said movable wall of the chamber for operating the rheostat to control the current flowing through the resistance element.

3. A heater of the character described, including a radiator casing, a quantity of volatile fluid therein, a plurality of electric resistance units connected in parallel and arranged for heating the fluid to vaporize the same, a chamber within the radiator and having the enclosing wall adapted to be moved by internal pressure within the chamber, fluid within the chamber which is slightly less volatile than the volatile fluid previously mentioned, and means actuated by the movements of the said movable wall of the chamber for automatically cutting out one or more of the resistance units when the first mentioned volatile fluid is completely vaporized.

In testimony whereof I affix my signature.

HARRY G. CATHCART.